United States Patent
Lehmann et al.

(10) Patent No.: US 9,454,001 B2
(45) Date of Patent: Sep. 27, 2016

(54) TOROIDAL HELIOSTAT

(75) Inventors: Alex Geoffrey Lehmann, Berridale (AU); Peter Richard Allenspach, Cooma (AU)

(73) Assignee: HELIOSYSTEMS PTY LTD., New South Wales (AU)

( * ) Notice: Subject to any disclaimer, the term of this patent is extended or adjusted under 35 U.S.C. 154(b) by 339 days.

(21) Appl. No.: 14/111,057

(22) PCT Filed: Apr. 13, 2012

(86) PCT No.: PCT/AU2012/000382
§ 371 (c)(1),
(2), (4) Date: Oct. 31, 2013

(87) PCT Pub. No.: WO2012/139169
PCT Pub. Date: Oct. 18, 2012

(65) Prior Publication Data
US 2014/0043705 A1  Feb. 13, 2014

(30) Foreign Application Priority Data

Apr. 15, 2011  (AU) ................ 2011901411

(51) Int. Cl.
*G02B 5/08* (2006.01)
*G02B 7/182* (2006.01)
(Continued)

(52) U.S. Cl.
CPC .......... *G02B 26/0816* (2013.01); *F24J 2/1052* (2013.01); *F24J 2/5427* (2013.01); *F24J 2/5264* (2013.01); *F24J 2002/1004* (2013.01); *F24J 2002/5458* (2013.01); *Y02E 10/47* (2013.01)

(58) Field of Classification Search
CPC .. G02B 7/183; G02B 19/0042; G02B 7/182; G02B 5/08; Y02E 10/47; Y02E 10/52; Y02E 10/45; Y02E 10/42; H01L 31/0547; F24J 2/12; F24J 2/10; F24J 2/38; F24J 2002/5468; F24J 2002/5479; F24J 2/52; F24J 2002/075; F24J 2002/1023
USPC ....... 359/580, 851, 852, 853, 864, 865, 867, 359/871, 872
See application file for complete search history.

(56) References Cited

U.S. PATENT DOCUMENTS 3,892,433 A   7/1975  Blake
4,227,513 A  10/1980  Blake et al.
(Continued)

FOREIGN PATENT DOCUMENTS

CA    1209000     8/1986
CN  101004298     7/2007
(Continued)

OTHER PUBLICATIONS

International Search Report, PCT/AU2012/000382, Jun. 5, 2012.
(Continued)

*Primary Examiner* — Jade R Chwasz
(74) *Attorney, Agent, or Firm* — Young & Thompson

(57) ABSTRACT

A toroidal heliostat and reflector frame for a heliostat are provided which passively adjust the apparent sagittal and/or tangential focal lengths of the reflector. This adjustment is provided by way of passive deflection of the reflector caused by one or more of gravitationally-induced deflection of one or more components of the heliostat; differential thermal expansion of materials of the heliostat; and/or relative movement between two or more components of the heliostat. Careful design of the heliostat enables optimisation of the power delivery profile and/or shape of the reflected image throughout the day.

24 Claims, 11 Drawing Sheets

(51) Int. Cl.
*G02B 5/10* (2006.01)
*G02B 26/08* (2006.01)
*F24J 2/10* (2006.01)
*F24J 2/54* (2006.01)
*F24J 2/52* (2006.01)

(56) References Cited

U.S. PATENT DOCUMENTS

| | | | |
|---|---|---|---|
| 4,459,972 | A | 7/1984 | Moore |
| 4,487,196 | A | 12/1984 | Murphy |
| 2008/0295883 | A1 | 12/2008 | Ducellier et al. |
| 2010/0199972 | A1 | 8/2010 | Brost |
| 2011/0235202 | A1* | 9/2011 | Ezawa ............ F24J 2/16 359/853 |
| 2012/0162799 | A1 | 6/2012 | Zhao et al. |

FOREIGN PATENT DOCUMENTS

| | | |
|---|---|---|
| CN | 101368764 | 2/2009 |
| CN | 101859014 | 10/2010 |
| CN | 101661153 | 3/2011 |
| DE | 29623934 | 5/2001 |
| FR | 1238883 | 8/1960 |
| WO | WO 2009081711 A1 * | 7/2009 ........ F24J 2/16 |
| WO | 2010083292 | 7/2010 |

OTHER PUBLICATIONS

Chen YT C.K. (2001). Non-Imaging Focusing Heliostat. Solar Energy, 71 (3), 155-164.

Chen YT, K.A. (2004). Comparison of two sun tracking methods in the application of a heliostat field. Solar Energy Engineering, 126, 638-644.

Guo M, W.Z. (2007). The optical designing method and the concentrating performance analysis for a toroidal heliostat with spinning-elevation sun tracking. Proc ISES Solar World Congress, Solar Energy and Human Settlement, 1879-1882.

Igel EA, H.R. (1979). Optical Analysis of Solar Facility Heliostat. Solar Energy, 22, 283-295.

Lim CS, L. (2009). Flux distribution of solar furnace using non-imaging focusing heliostat. Solar Energy, 83, 1200-1210.

Zaibel R, D.E. (1995). An astigmatic corrected target-aligned heliostat for high concentration, Solar Energy Materials and Solar Cells, 37, 191-202.

Written Opinion, PCT/ISA/237, Jun. 5, 2012.

Extended European search report, dated Dec. 4, 2014, in corresponding European Patent Application No. 12771762.7.

* cited by examiner (a)

(b)

TOROIDAL HELIOSTAT

FIELD OF THE INVENTION

This invention relates to a toroidal heliostat. More particularly, the invention relates to a toroidal heliostat which passively adjusts focal lengths to reduce the effects of astigmatism.

BACKGROUND

A heliostat is a device generally provided in a fixed location that includes a reflective surface to reflect solar energy toward a predetermined, fixed target. A heliostat, or more accurately an array of heliostats, is most commonly used in concentrating solar power installations.

A heliostat includes a tracking mechanism which tracks the movement of the sun to maintain the reflected image on the target. To achieve this, a line normal to the centre of the reflective surface must generally bisect the angle formed between the sun, the reflective surface, and the target. As a result, the angle of incidence of sunlight upon the reflective surface varies with the time of day and year.

The reflective surface of a heliostat may be planar, but is more commonly concave to concentrate reflected solar rays towards a focal point which is generally at or adjacent the target. U.S. Pat. No. 3,892,433 to Blake, for example, discloses a system including an array of spherical mirrors reflecting light towards a heat receiver which generates superheated steam to drive a steam turbine generator.

In a focusing heliostat, astigmatism causes the size of the reflected image to vary throughout the day, becoming larger as the angle of incidence (with respect to the normal) increases. A larger image reduces the energy density and, if the image is larger than an aperture in the target, results in wasted energy and reduced efficiency. Conversely, if the image is smaller than the aperture, the excess area of the aperture increases heat loss to the atmosphere.

It has been demonstrated by Igel & Hughes (Igel, E. A., & Hughes, R. L. (1979). Optical analysis of solar facility heliostats. *Solar Energy*, 22, 283-295) that the effects of astigmatism can be minimised for extended periods of time during the day by using non-imaging optics (i.e. an asymmetric reflector).

U.S. Pat. No. 4,459,972 to Moore discloses a concave focusing reflector which is formed as a section of a toroid defined by two unequal radii of curvature in mutually perpendicular planes. The toroidal heliostat reflector provides a well-defined concentrated image with power distribution and size which varies less than that of a spherical mirror throughout the operational day and year. If the plane formed by the angle between the incident and reflected rays is maintained such that its intersection with the mirror remains substantially fixed in use, aberrations in the image are reduced.

Toroidal heliostats differ from spherical heliostats in that they have different focal lengths for each of the different axes (generally referred to as the tangential and sagittal directions or axes). The ability to optimise these focal lengths independently (i.e. by adjusting the radii of curvature) is the key to what makes the toroidal heliostat more effective than a spherical heliostat.

The toroidal heliostat shape is an approximation of the ideal paraboloidal shape that would be constructed were the target considered as the focal point of a large paraboloidal surface intersecting with the heliostat position. The toroidal shape approximates the curvature of the paraboloidal surface with the tangential axis aligned with the focal axis of the paraboloidal surface, and the sagittal direction perpendicular to it.

Chen et al. (Chen, Y. T., Chong, K. K., Bligh, T. P., Chen, L. C., Yunus, J., Kannan, K. S., . . . Tan, K. K. (2001). Non-imaging, focusing heliostat. *Solar Energy*, 71(3), 155-164) discloses a variation of the toroidal heliostat in which the reflective surface comprises a plurality of planar mirrors or facets forming a pseudo-toroidal surface. Each row and column of mirrors can be individually pivoted to achieve variable focusing to ameliorate the image aberration when combined with a spinning elevation or rotation-elevation tracking method (as opposed to the more common altazimuth or equatorial heliostat mounts of the prior art). However, the heliostat of Chen et al. requires means for rotating not only the heliostat frame about two axes, but also means for adjusting the angle of each row and column of mirrors mounted to the frame, contributing significantly to the complexity and cost of the heliostat.

Heliostats are generally the most expensive component of a concentrating solar power installation. It is therefore desirable to provide a heliostat which leads to improved efficiency and/or reduced manufacturing and maintenance costs to generate electricity at lower cost.

OBJECT OF THE INVENTION

It is therefore an object of the invention to provide a heliostat and/or a reflector frame for a heliostat which overcomes or at least ameliorates one or more disadvantages of the prior art, or alternatively to at least provide the public with a useful choice.

Further objects of the invention will become apparent from the following description.

SUMMARY OF INVENTION

According to a first aspect the invention may broadly be said to consist in a heliostat for reflecting incident sunlight to a receiver, comprising:
- a toroidal reflector having predetermined static curvatures in orthogonal sagittal and tangential directions and being adapted to deflect in at least one of the sagittal and tangential directions;
- a reflector frame upon which the toroidal reflector is mounted, the reflector frame being adapted to permit or induce said deflection passively; and
- a rotatable mounting mechanism upon which the reflector frame is mounted, the mounting mechanism having a first axis of rotation adapted to be aligned with the receiver, and a second axis of rotation substantially orthogonal to and rotatable about the first axis;
- wherein said passive deflection, in use, independently modifies the curvature of the reflector in the sagittal and/or tangential directions to optimise apparent sagittal and/or tangential focal lengths for variable angles of incidence of sunlight upon the reflector.

Preferably the deflection of the toroidal reflector in use is gravitationally-, thermally- and/or mechanically-induced, and is dependent upon at least one of alignment and/or temperature of at least part of the heliostat.

Preferably said apparent sagittal and/or tangential focal lengths are optimised to meet predetermined optimisation criteria.

Preferably said optimisation criteria includes one or more of a required power delivery profile; and the apparent size or shape of an aperture in the receiver.

Preferably said apparent sagittal and/or tangential focal lengths are optimised by selection of appropriate geometry and/or materials of the heliostat to provide the required dynamic deflection.

The rotatable mounting means preferably comprises a rotation slew drive adapted to be mounted to a fixed platform and rotate about the first axis, and an elevation slew drive mounted to the rotation slew drive and adapted to receive the reflector frame and rotate about the second axis. Preferably the rotatable mounting means further comprises a manual adjustment means for manually adjusting the first axis into a desired alignment. The manual adjustment means preferably comprises a pair of annular wedges provided about a spigot and rotatable with respect to each other, the wedges comprising interlocking rings on their facing surfaces to prevent translational movement with respect to each other.

Alternatively, the rotatable mounting means comprises a rotation slew drive adapted to be mounted to a fixed platform and rotate about the first axis, and a cable-actuated elevation drive mounted to the rotation slew drive and adapted to tilt the reflector frame about the second axis. The elevation drive is preferably mounted to the distal end of an elevation drive support structure projecting forward of the reflector and aligned, in use, with the receiver. The rotatable mounting means preferably further comprises a dynamic balancer compensating for variations in the length of cables of the cable-actuated elevation drive with variations in elevation as the reflector is tilted. The dynamic balancer is adjustable such that the degree of compensation for variation in cable length may be varied, and the overall length of the cables results in passive adjustment of the heliostat reflector as the reflector is tilted.

Preferably the heliostat further comprises a mechanical limiter to limit or dampen high amplitude deflection of the reflector or reflector frame and thereby prevent damage to the heliostat.

Preferably the mechanical limiter comprises a tether between the reflector and the mounting mechanism permitting small deflections required for passive deflection, but damping high amplitude vibrations of the reflector.

Preferably the mechanical limiter is adapted to limit or dampen high amplitude deflection and/or induce further deflection dependent upon the alignment of the reflector.

According to a second aspect, the invention may broadly be said to consist in a reflector frame for supporting a concave toroidal reflector of a heliostat, the reflector frame being adapted to independently permit or induce passive deflection of the toroidal reflector in tangential and/or sagittal directions thereof to passively modify an apparent focal length of the reflector in at least one of said directions in use.

Preferably the reflector frame comprises:
at least one first framing member aligned in a first direction; and
at least one second framing member aligned in a second direction substantially orthogonal to the first direction, the second framing member being attached to the first framing member, and the first and/or second framing members are adapted for attachment to the toroidal reflector;
wherein the first and second framing members each independently permit or induce limited passive dynamic deflection in the toroidal reflector in the respective first and/or second directions, in use.

Preferably said first and/or second framing members are semi-rigid and adapted to deflect and induce a corresponding deflection in the toroidal reflector, said deflection being caused at least in part by the weight of the respective first or second framing members and/or the weight of the toroidal reflector thereupon due to gravity, whereby said dynamic deflection is dependent upon alignment of the reflector frame as it is rotated in use.

Alternatively said first and/or second framing members may be substantially rigid and the reflector frame further comprises mounting means adapted to support the toroidal reflector whilst permitting deflection thereof, said deflection being caused at least in part by the weight of the toroidal reflector whereby said dynamic deflection is dependent upon alignment of the reflector frame as it is rotated in use.

Alternatively, or additionally, said deflection may be caused at least in part by differential thermal expansion between materials of the reflector frame and/or toroidal reflector, whereby said dynamic deflection is dependent upon the temperature of at least a part of the heliostat.

Alternatively, or additionally, said deflection may be caused at least in part by relative movement between the reflector frame and the heliostat, in use.

Preferably a direction and magnitude of said deflection in use is determined substantially by attachment positions between the first and second framing members.

Preferably said attachment positions are predetermined to optimise the heliostat image based upon the known position of the heliostat in a solar field, with respect to a target.

Preferably the reflector frame further comprises a mechanical limiter to limit or dampen high amplitude deflection of the reflector or reflector frame and thereby prevent damage to the heliostat.

Preferably the heliostat image is optimised to maintain substantially constant apparent focal lengths in both sagittal and tangential directions of the toroidal reflector.

Alternatively, the heliostat image may be optimised to obtain a desired power delivery profile.

Alternatively, the heliostat image may be optimised to match the shape of an aperture of the target.

In a third aspect, the invention may broadly be said to consist in a heliostat comprising a reflector frame according to the second aspect of the invention.

Preferably said heliostat further comprises a reflector, and passive deflection of the reflector is induced by one or more of:
gravitationally-induced deflection of one or more components of the heliostat;
differential thermal expansion of materials of the heliostat; and/or
relative movement between two or more components of the heliostat.

Further aspects of the invention, which should be considered in all its novel aspects, will become apparent from the following description.

DRAWING DESCRIPTION

A number of embodiments of the invention will now be described by way of example with reference to the drawings in which.

Figure 15:
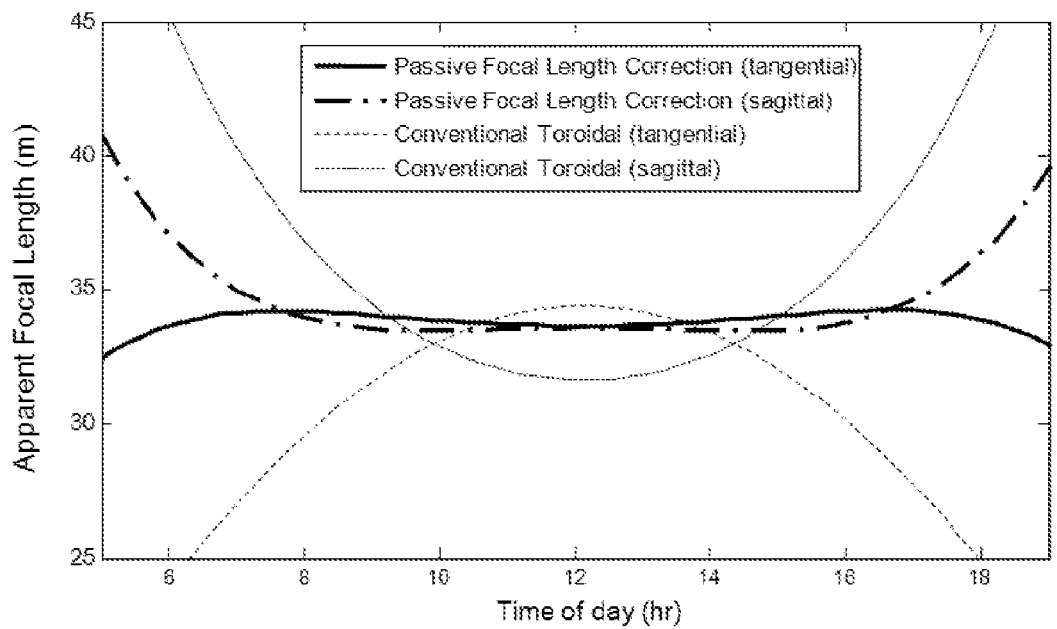
Figure 16:
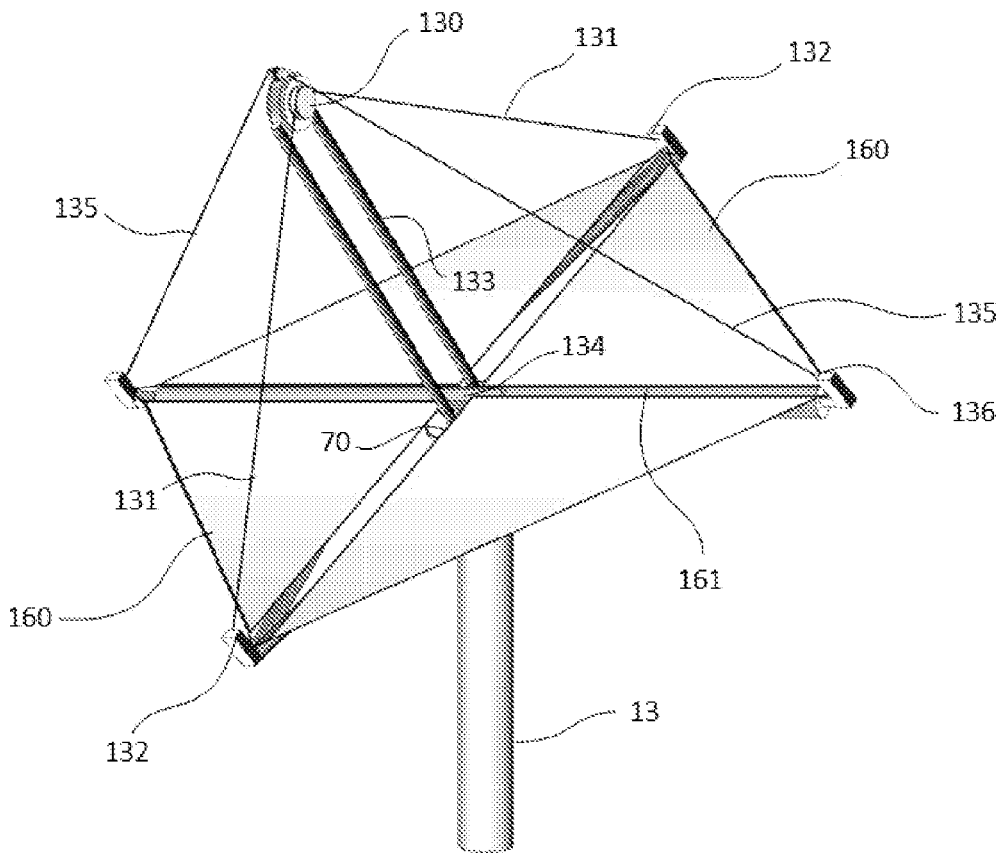

FIG. 15 is a graph showing the apparent tangential and sagittal focal lengths throughout a day of a heliostat according to the present invention (solid lines), compared to a toroidal heliostat of the prior art (dashed lines); and FIG. 16 is a diagram of a further embodiment of a heliostat according to the present invention, including stretched membrane reflector facets adapted for an alternative mounting/tracking mechanism.

DETAILED DESCRIPTION OF THE DRAWINGS

Throughout the description like reference numerals will be used to refer to like features in different embodiments.

The term "toroidal" as used throughout the description is intended to refer to a concave reflector surface which is substantially toroidal. That is, the curvatures of the reflector surface in the orthogonal sagittal and tangential directions are preferably circular arcs, but may not be perfectly circular. Due to imperfections, approximations, and/or deflections in the reflector, the surface curvatures may be discontinuous, piecewise linear, or parabolic, for example. Any such variation is possible without departing from the scope of the invention.

Where reference is made below to "focal lengths" of the invention, such references should be interpreted as referring to the relevant apparent focal length (i.e. the property of the reflected light), as distinct from the relevant curvature of the reflector.

The term "passive" refers to any adjustment in an apparent focal length of a toroidal reflector which comes about through normal use of the heliostat, as opposed to being caused by some "active" means such as an actuator.

Figure 1:
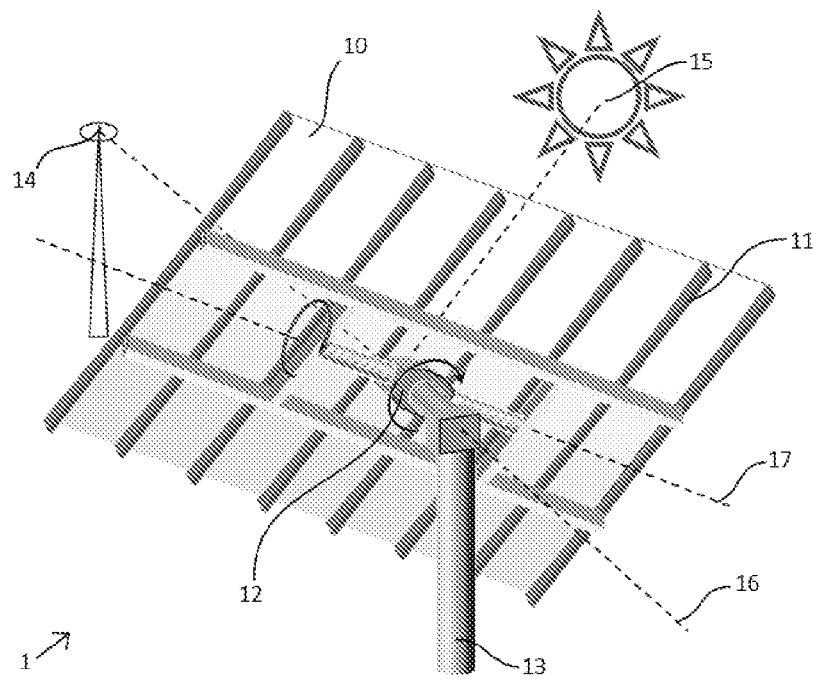
FIG. 1 is a diagrammatic illustration of a heliostat according to a first embodiment of the present invention.

A toroidal heliostat according to the present invention is shown diagrammatically in FIG. 1. The heliostat 1 generally comprises a toroidal reflector 10 (seen from the reverse, the concave toroidal shape of the reflector is not apparent), a reflector frame 11 supporting the reflector, a rotatable mounting or tracking mechanism 12 adapted to rotate the reflector and frame to track the movement of the sun (as described in further detail below), and a pier or platform 13 providing sufficient clearance for rotation of the reflector frame 11 and ideally a substantially unobstructed line of sight to the sun, substantially free of shadows cast upon the reflector 10 as the sun moves throughout the day and seasons.

Figure 2:
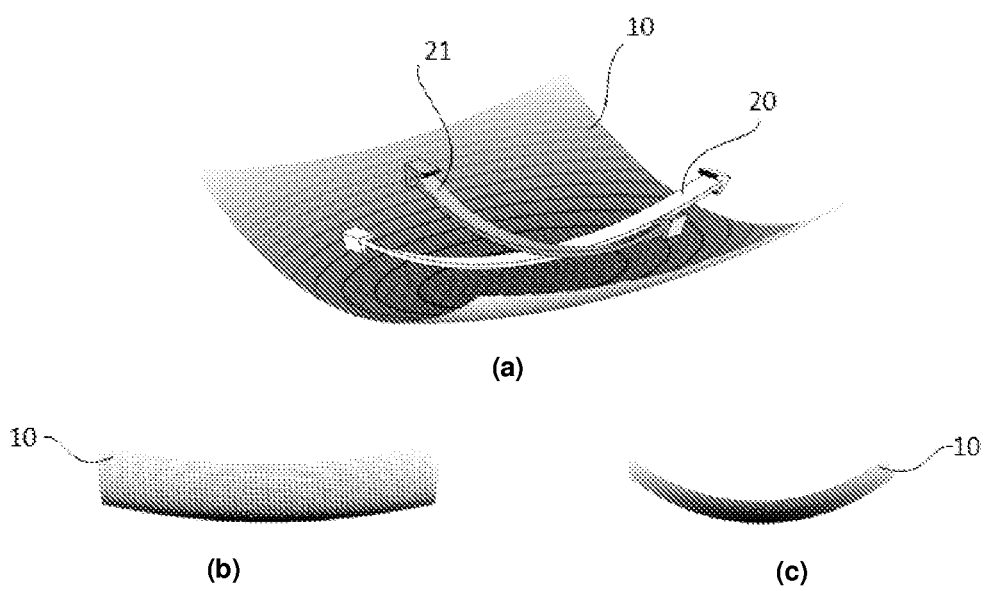
FIG. 2 is a wireframe diagram illustrating the tangential and sagittal radii of a toroidal reflector in: (a) an isometric view; (b) a side view showing the tangential radius; and (c) an end view showing the sagittal radius.

The toroidal shape of the reflective surface 10 is illustrated in FIG. 2. In particular, FIG. 2(a) shows the two non-equal axes of curvature, which are generally referred to as the tangential radius/direction 20 (shown in profile in FIG. 2(b)) and the sagittal radius/direction 21 (shown in profile in FIG. 2(c)). The curvatures are exaggerated in this diagram to clearly illustrate the toroidal shape of the reflector.

In a preferred embodiment of the invention, the reflector frame 11 upon which the toroidal reflector is mounted comprises a plurality of first framing members aligned in a first direction, and a pair of second framing members aligned in a second direction substantially orthogonal to the first direction as shown in FIG. 1, for example. The first framing members are preferably provided in a generally planar arrangement, with the second framing members also being provided in a generally planar arrangement, the respective planes being substantially parallel. That is, the toroidal reflector 10 is preferably mounted to the first framing members, which are in turn each mounted to the substantially orthogonal second framing members.

The first and second framing members according to this example embodiment of the invention are substantially semi-rigid and resilient.

The toroidal reflector 10 preferably comprises a reflective surface mounted to the first framing members such that it conforms to a static curvature defined by the reflector frame. The actual curvature of the reflector is preferably as close as possible to the ideal smooth toroidal shape, but nevertheless may be an approximation. Some of the effects that occur are rippling/sagging between supports, and 'bottle top' effects around the edge. These are preferably controlled as much as possible by appropriate selection of the mechanical properties of the reflector membrane (e.g. glass thickness).

Figure 3:
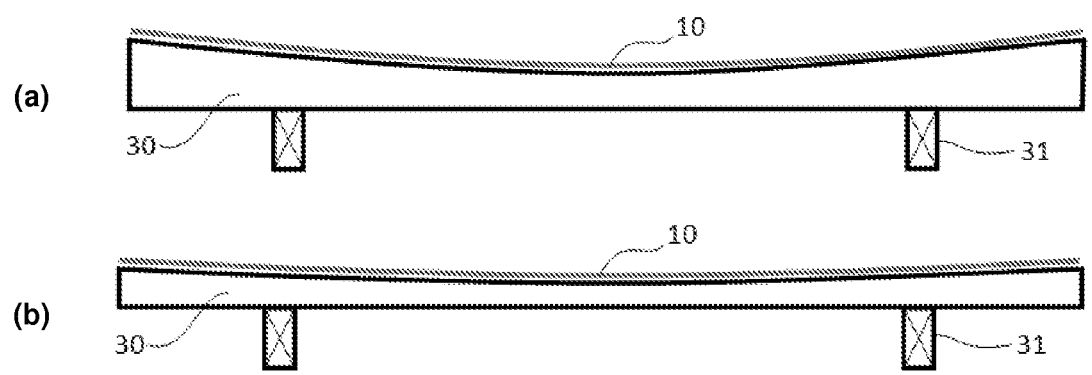
FIG. 3 shows the reflector frame of an example embodiment of the invention with: (a) a lesser radius of curvature; and (b) a greater radius of curvature in the tangential directions.

As illustrated by way of example in FIGS. 3(a)-4(b), the plurality of first framing members preferably comprises a plurality of parallel elongate support ribs 30 which each have a concave shape along their length in the first direction. This concave shape defines the static curvature in the first direction of the toroidal reflector mounted thereupon, as illustrated in FIGS. 3 (a) and (b), which show examples of two ribs 30 having greater and lesser curvature (or lesser and greater radii of curvature), respectively.

Figure 4:
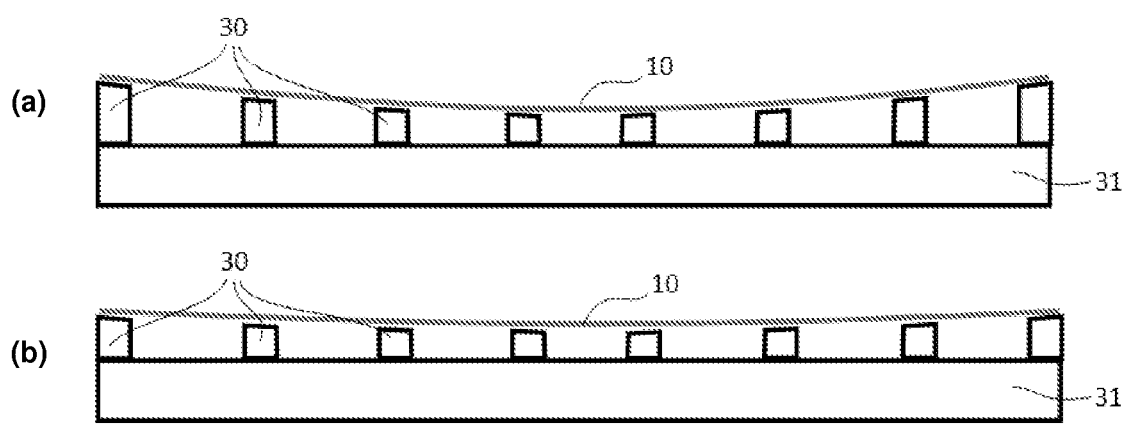
FIG. 4 shows the reflector frame of an example embodiment of the invention with: (a) a lesser radius of curvature; and (b) a greater radius of curvature in the sagittal directions.

Referring to FIGS. 4 (a) and (b), which show example embodiments of reflector frames from another angle, the support ribs 30 together also define a curvature of the toroidal reflector in the second direction, with examples of ribs 30 having greater and lesser curvature shown in the respective drawings.

According to this embodiment of the reflector frame 11, the support ribs 30 are each attached to a pair of parallel elongate chassis bearers 31 forming the second framing members. The chassis bearers are therefore preferably aligned in the second direction, substantially orthogonal to the support ribs 30 as shown.

Figure 5:
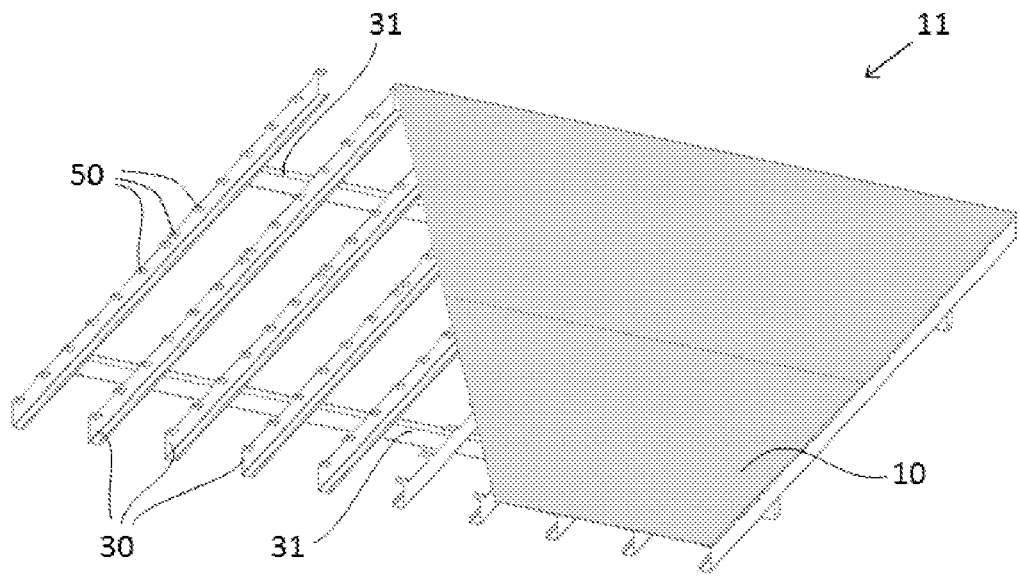
FIG. 5 is a partial-cutaway front isometric view of a reflector frame according to a preferred embodiment of the present invention.
Figure 6:
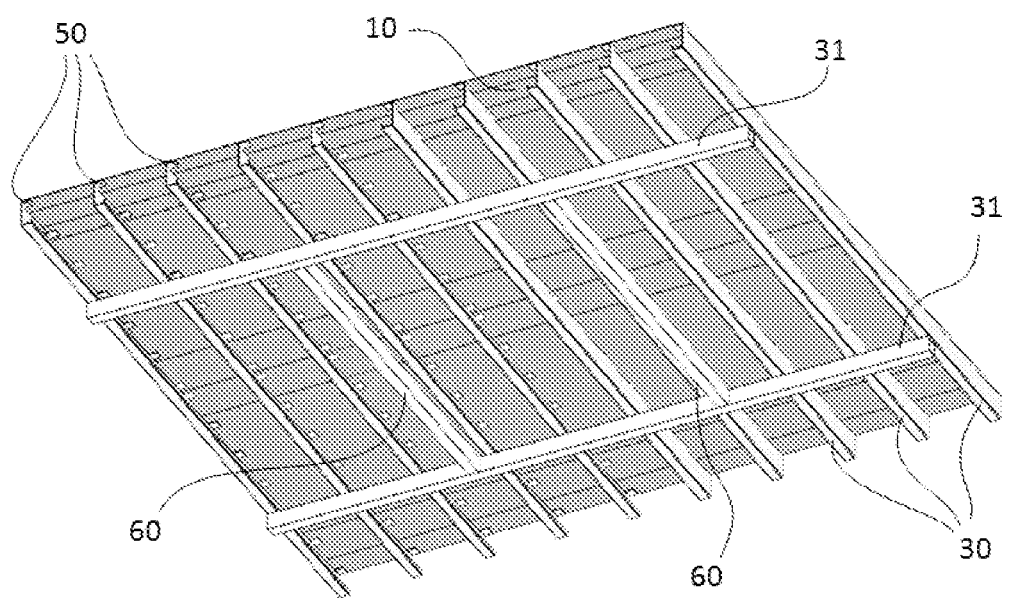
FIG. 6 is a reverse isometric view of the reflector frame of FIG. 5.

FIGS. 5 and 6 show isometric views of a preferred embodiment of the reflector frame 11 of the present invention from the front and rear, respectively (the toroidal reflector 10 being shown in partial cutaway in FIG. 5).

As can be seen from these drawings, the support ribs 30 preferably have a generally 'C'-shaped cross-section including a plurality of discrete mounting points 50 along their length for attachment to the toroidal reflector 10.

The reflector frame 11 is preferably also provided with a pair of chassis cross members 60 which extend between the chassis bearers 31 to allow the reflector frame to be mounted to the tracking mechanism 12. The cross members 60 are preferably provided in the same plane as the chassis bearers 31.

The precise position of the attachment between the support ribs 30 and chassis bearers 31, and the chassis bearers 31 and chassis cross members 60, or more particularly the spacings between the pairs of chassis bearers 31 and chassis cross members 60, are carefully selected as described below.

Figure 7:
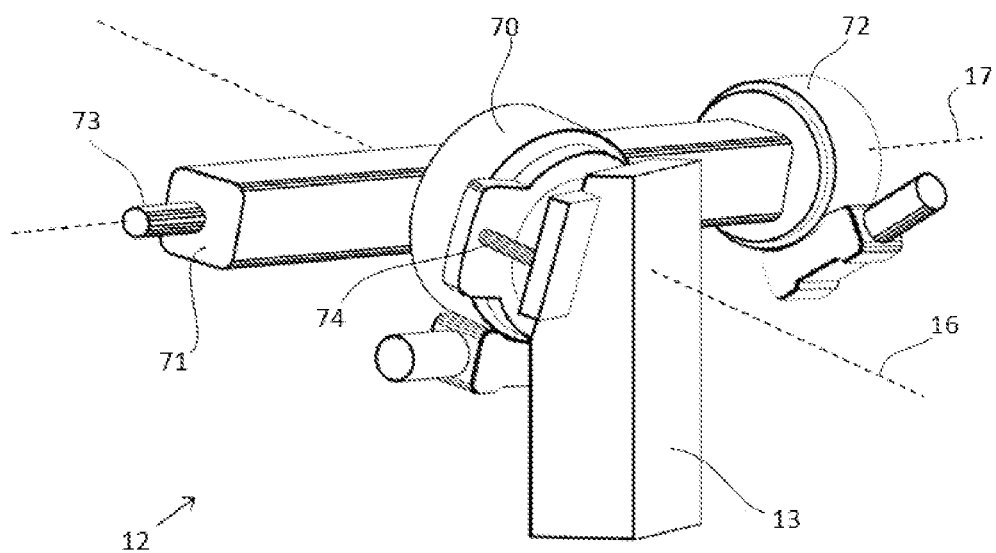
FIG. 7 is a diagram of a preferred tracking mechanism for use in the heliostat according to the present invention.

Referring to FIG. 7, an example embodiment of the tracking mechanism 12 is shown in detail. The tracking mechanism 12 includes means for rotating the reflector (not shown) about orthogonal axes. In the illustrated embodiment, the rotating means comprises a first slew drive 70 (which may be referred to as the rotation slew drive) mounted to the platform 13 and adapted to rotate about the first axis 16. The tracking mechanism preferably also includes manual adjustment means 74 enabling the first or rotation axis 16 to be manually adjusted into a desired alignment.

Mounted to the first slew drive 70 in this embodiment is a boom or support member 71 rotatable about the first axis 16 by the first slew drive 70. Mounted to the support member 71 is a second slew drive 72 (which may be referred to as the elevation slew drive) adapted to rotate the reflector frame about the second axis 17. The support member preferably includes an axle 73 within the support member 71. The chassis cross members 60 of the reflector frame 11 (not shown in FIG. 7) are preferably adapted to be mounted to opposing ends of the axle which project from within the support member 71, and the reflector frame (and reflector) is thus rotatable about both the first and second axes in use. The length of the support member 71, which acts as a boom or yoke, can be easily changed to fit between the chassis cross members 60, preferably aligned in the first direction substantially centrally with respect to the toroidal reflector 10 and reflector frame 11. Any deflection of the support member 71 preferably does not affect the curvature of the toroidal reflector 10.

Figure 8:
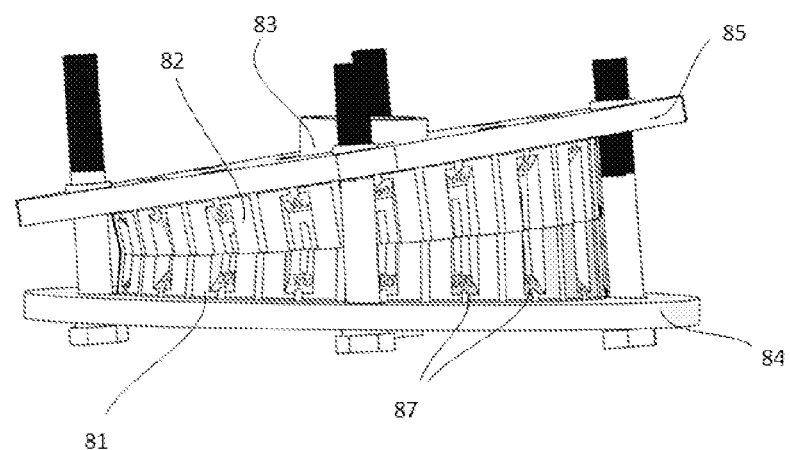
FIG. 8 shows (a) side; and (b) cross-section views of a preferred wedge alignment system used to manually align the first (rotation) axis to point at the target during installation of the heliostat.
Figure 8:
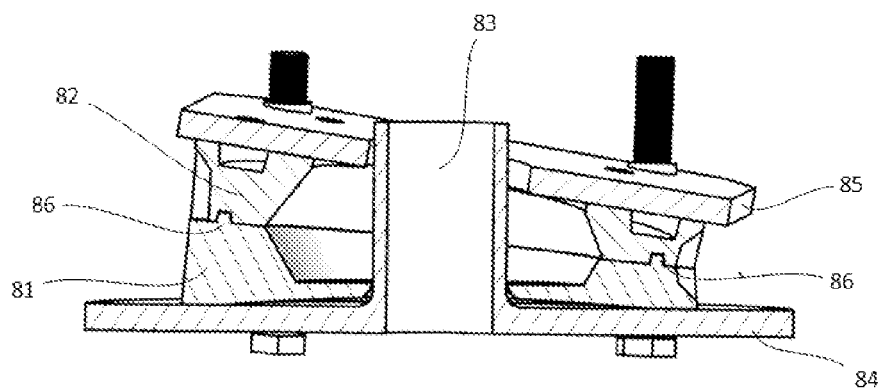

The manual adjustment means 74 and slew drives of the tracking mechanism 12 of FIG. 7 allow the rotation axis 16 of the tracking mechanism to be appropriately aligned to enable the spinning elevation tracking method. The manual adjustment means 74 preferably comprises two annular wedges as shown in detail in FIG. 8, The wedges 81 and 82 are placed over a spigot 83 and rotated with respect to each other to vary the angle between the post top plate 84 (with spigot 83) and the tracking mechanism mount plate 85. There is preferably an interlocking ring 86 on the facing surfaces of the two wedges to prevent translation movement upon rotation and stop them from sliding in the plane that separates them. The wedges preferably have angle markings 87 on the outside such that once the rotation axis 16 is correctly aligned, the angles of the wedges can be read off from the outside and used to determine mechanical limits of the heliostat as well as other parameters. The maximum angle between post top plate 84 and tracking mechanism mount plate 85 is achieved when the wedges 81 and 82 are rotated to the same point. The post top plate 84 and mount plate 85 are preferably parallel when the two wedges are oriented at 180 degrees from each other.

In use, the toroidal reflector 10 will be rotated by the tracking mechanism 12 to reflect sunlight towards a target or receiver 14, typically an aperture in a tower, continuously throughout the day. As such, an imaginary line normal to the centre of the reflector will substantially bisect the angle formed between the sun 15, reflector 10, and target 14. The angle of incidence of sunlight on the reflective surface thus varies throughout the day.

The curvatures of the toroidal reflector 10 in the first and second directions largely dictate the focal length of the toroidal reflector 10 in the corresponding tangential and sagittal directions, respectively. However, the precise apparent focal lengths of the toroidal reflector are also dependent upon the angle of incidence of light upon the reflector. Since the angle of incidence varies throughout the day as the sun moves through the sky, so too do the apparent tangential and sagittal focal lengths of the reflector for given tangential and sagittal curvatures. These variations in focal lengths result in corresponding variations in the size and shape of the reflected image upon the target.

The shape of an ideal paraboloidal reflector (of which the heliostat is just a small segment), a substantially hemi-paraboloidal concave reflector having a primary axis aligned with the sun and having the target or receiver at its focal point, varies significantly during the day in order to maintain the target at its focal point whilst intersecting with the heliostat position. At any given point in time, the difference between the ideal paraboloidal reflector surface and an ideal toroidal surface is very small. As both ideal surfaces change shape for different times of day, the mirror or reflector of a practical heliostat must also adjust its curvature to maintain high concentration and minimise astigmatism. As described in further detail below, the toroidal heliostat of the present invention has a variable reflector shape to achieve, at least in one embodiment, high concentration for as long a period of operation as possible.

Actively adjusting the curvature of the reflector to compensate for variations in the angle of incidence allows the energy concentration ratio of the heliostat to be maximised over a longer operation time than heliostats having toroidal reflectors of fixed curvature. Higher concentration ratios lead to higher efficiencies and greater flexibility with energy delivery to a receiver. The disadvantage of actively modifying the curvature is the additional cost of components (e.g. actuators and control circuitry), maintenance, and energy required to achieve active curvature adjustment.

The present invention provides a heliostat and/or associated components which passively adjust the reflector curvature to provide improved performance and efficiency without the additional cost of components implementing active curvature adjustment.

As described above, the first and second framing members (support rib 30 and chassis bearer 31) of the reflector frame 11 are substantially semi-rigid and resilient. That is, the first and second framing members are sufficiently rigid to support the toroidal reflector 10, but permit at least some degree of deflection or bending along their length under certain conditions. In particular, in a preferred embodiment of the invention the degree and direction of deflection is dependent upon the alignment or orientation of the reflector frame which varies in use. This can be controlled by careful selection of physical properties of the heliostat, such as the rigidity and/or spacing between the respective pairs of chassis bearers 31 and chassis cross-members 60, the number, rigidity and/or spacing of the support ribs 30, the nature of the connection with the tracking mechanism 73 and/or the physical properties of the reflector facet, for example.

Figure 9:
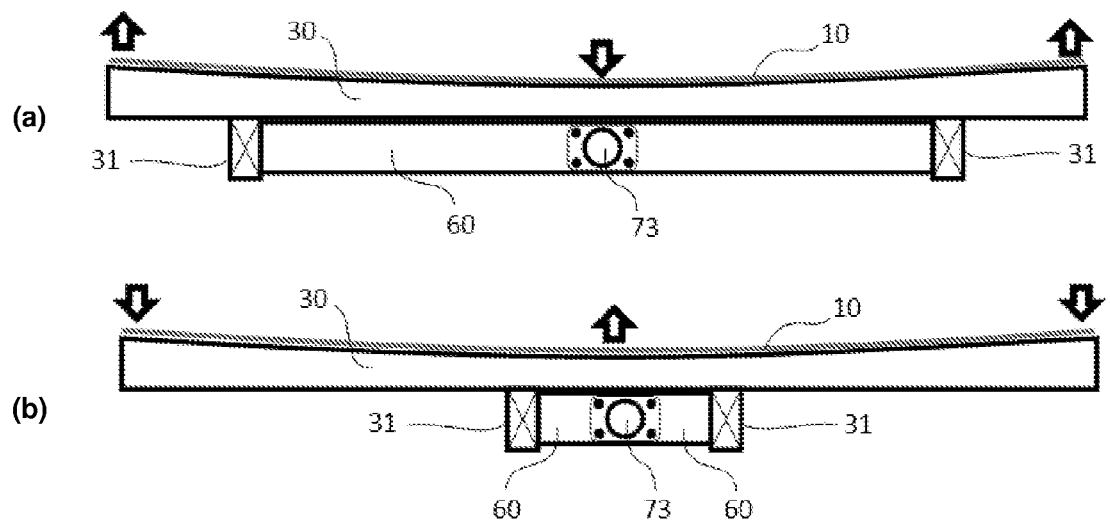
FIG. 9 illustrates deflection of the reflector frame and toroidal reflector in the tangential direction when in a horizontal orientation in: (a) a first example configuration in which curvature of the reflector increases; and (b) a second example configuration in which curvature of the reflector decreases.

Referring to FIGS. 9(a) and (b), for example, two possible configurations are shown. In FIG. 9(a), the spacing between the chassis bearers 31 (and thus the length of the chassis cross members 60) is relatively wide. In a horizontal orientation of the reflector frame, as shown by way of example, this will cause an increased curvature in the tangential direction of the reflector 10 as illustrated by the arrows. The relatively wide spacing of the chassis bearers 31 results in the support ribs 30 forming suspended spans therebetween. In FIG. 9(b), a much narrower spacing of chassis bearers 31 is shown. This causes opposing ends of the support ribs 30 to significantly overhang the chassis bearers 31 in the manner of a cantilever such that they deflect downwardly in the horizontal orientation of the reflector frame, as illustrated by way of example for comparison with FIG. 9(a). In both cases, the degree of deflection depends also on the bending strength of the support ribs 30 over the chassis bearers 31. It will be appreciated that a required level of deflection for a given material in the tangential direction can thus be obtained by varying the spacing between the chassis bearers 31.

Figure 10:
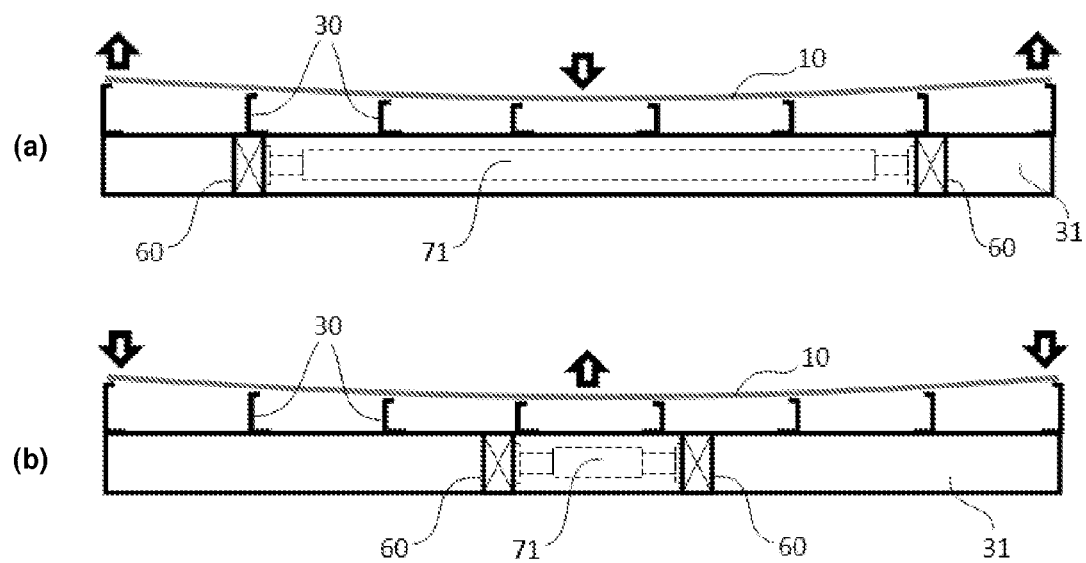
FIG. 10 illustrates deflection of the reflector frame and toroidal reflector in the sagittal direction when in a horizontal orientation in: (a) a first example configuration in which curvature of the reflector increases; and (b) a second example configuration in which curvature of the reflector decreases.

Referring to FIGS. 10(a) and (b), two example configurations of chassis cross-member 60 spacings are shown. A relatively wide spacing as shown in FIG. 10(a) results in an increase in curvature of the toroidal reflector in the sagittal direction as the central area of the reflector frame deflects downwardly when the reflector frame is in a horizontal orientation as illustrated, while the narrower spacing of FIG. 10(b) results in decreased curvature as the cantilever-like ends of the chassis bearers deflect downwardly relative to the central portion. The length of the support member 71 can be varied to match the spacing of the cross members 60 as shown.

It will be appreciated that the deflections in the sagittal and tangential directions vary as a function of the forces (gravitational, thermal or mechanical) and their directions as the reflector changes its orientation during operation of the heliostat. By way of example, the gravitational force exerted downwards causes tangential and sagittal deflection in the reflector, dependent on the elevation angle (i.e. orientation) of the heliostat. When the heliostat is substantially horizontal, the deflections are substantially as illustrated by way of example in FIGS. 5 and 6 due to the weight of the reflector frame and toroidal reflector. On the other hand, when the heliostat is substantially vertical, the resilience of the reflector frame and/or toroidal reflector cause the reflector to return towards the static curvature.

Figure 11:
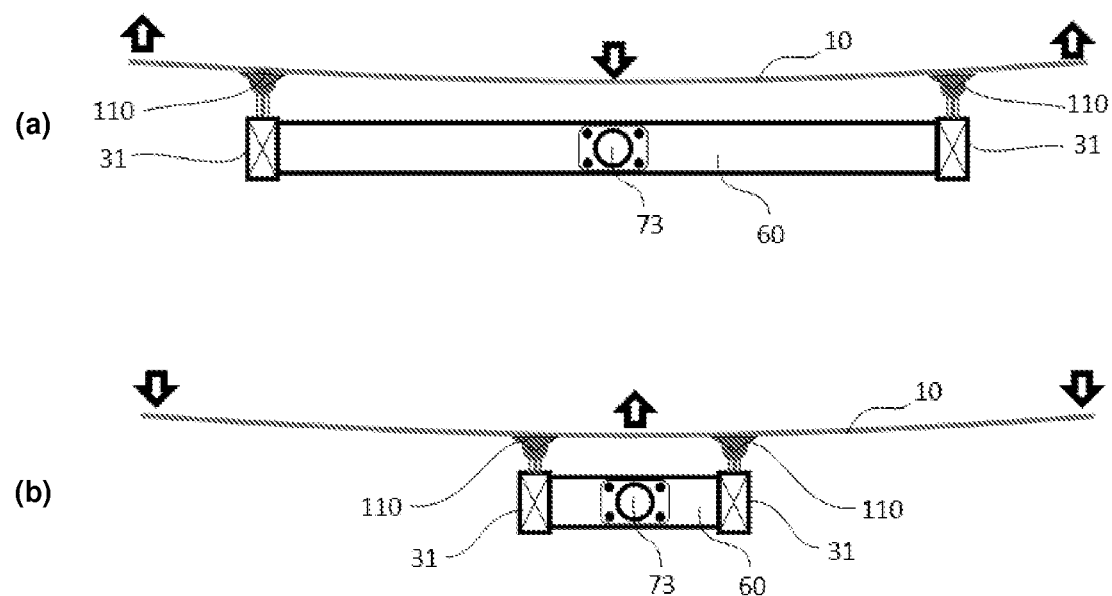
FIG. 11 illustrates an alternative embodiment of a reflector frame according to the present invention in (a) a first example configuration in which curvature of the reflector increases; and (b) a second example configuration in which curvature of the reflector decreases.

In an alternative embodiment of the invention, a toroidal reflector 10 having sufficient stiffness and rigidity to be substantially self-supporting may be pre-formed to a required static curvature. Referring to FIG. 11, the toroidal reflector 101 in this embodiment is pre-formed to the desired static curvature, and can support its own weight without a support rib structure. The reflector 101 may simply be supported upon the reflector frame by a plurality of mounting means or mounting members 110 provided upon the reflector frame 11.

In the embodiment of FIG. 11, the dynamic deflections induced in the toroidal reflector 10 are preferably substantially independent of deflections in the chassis itself (if any). That is, the four connection points preferably do not induce any significant curvature in the reflector, but instead provide fixed mounting points with respect to which the reflector 10 deflects. In this case, the first and second framing members preferably comprise simply a pair of chassis cross-members 60 and a pair of chassis bearers 31, respectively. As illustrated in the two possible configurations shown in FIGS. 11(a) and (b), the direction and degree of deflection of the reflector in the tangential direction is dependent upon the spacing between the chassis bearers 31, which is determined by the length of the cross-members 60. In a horizontal orientation of the reflector frame as illustrated, a relatively wide spacing of the chassis bearers 31 as shown in FIG. 11(a) results in an increase in curvature as indicated by the arrows. FIG. 11(b) shows a narrower spacing which results in a greater overhang of the toroidal reflector 10 past the mounting members 110, causing a downward deflection of the ends and a reduced curvature. According to this embodiment, at least the toroidal reflector 10 is substantially semi-rigid and resilient to achieve the required dynamic deflection, however the reflector frame may also be semi-rigid.

Those skilled in the art will appreciate that a reduction in the curvature of the toroidal reflector 10 results in an increase in the focal length of the reflector in that direction. Conversely, an increase in curvature results in a shorter focal length. As the reflector 10 is mounted and rotated on the tracking mechanism 12 to follow the movement of the sun, its orientation changes with the elevation of the sun.

Passive adjustment heliostats according to the present invention may require mechanical limiters on the deflection such that occasional high wind forces do not cause the destruction of the heliostat. These mechanical limiters can allow the mirror to undergo passive adjustment under normal operation but restrict or dampen high amplitude deflection.

Figure 12:
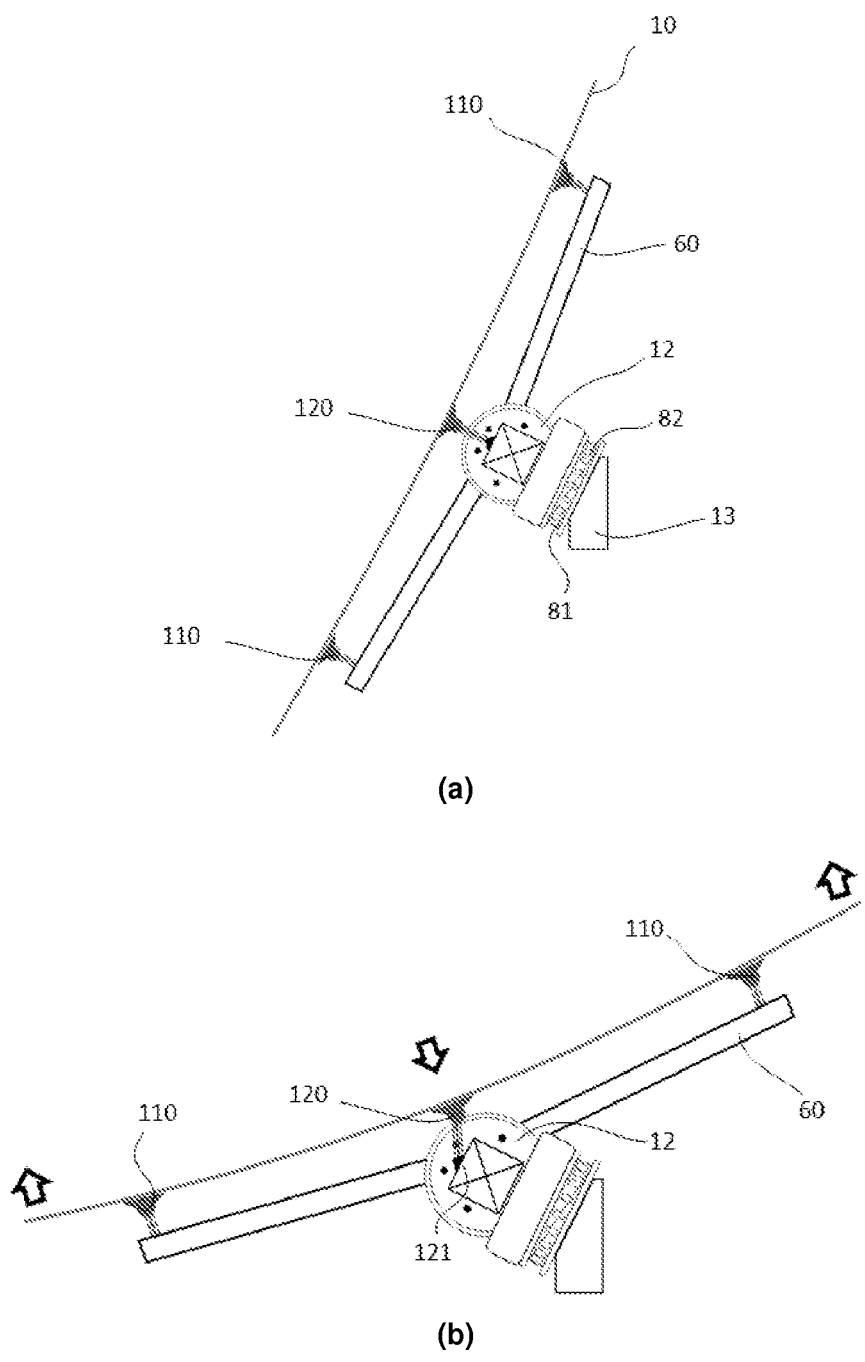
FIG. 12 shows a further embodiment of a heliostat according to the present invention, including a mechanical limiter, in (a) a first example alignment; and (b) a second example alignment.

Referring to FIG. 12(a), an example embodiment of the mechanical limiter system involves the addition of a tether in the form of a flexible connection 120 between the reflector 10 and the tracking mechanism 12 to act as a mechanical limiter. The flexible connection may comprise a strut or wire, for example. The connection 120 allows small deflections required for normal passive adjustment, but high amplitude deflection, and in particular vibration or oscillation, of the reflector are damped. The optimisation of the static and dynamic properties of the reflector 10 is thus achieved by varying the spacing of the mirror mounting members 110 and chassis bearers 60, and modifying the length and/or connection position of the flexible connection 120.

The flexible connection 120 may alternatively, or additionally, be utilised to induce further deflection in the reflector. When the heliostat of FIG. 12(a) is re-oriented as shown in FIG. 12(b), for example, the flexible connection 120 may become stretched and thereby induce an additional deflection as indicated by the arrows. Changing elevation angle thus causes the curvature of the reflector 10 to be increased.

Mechanical limitation and/or modification of the dynamic movement of the heliostat mirror may be achieved in many different ways, and is characterised generally by a connection between a moving part of the mirror and another location (moving or non-moving) on the heliostat reflector, tracking mechanism or post. These connections could alternatively be achieved using any means such as wires, brackets, stabilisers or counterweights.

Optimisation of the passive adjustment properties of the mirror involves the characterisation of one or more of gravitationally-, thermally- and/or mechanically-induced deflections of the reflector 10. Passive adjustment of focal lengths can be independently optimised in the tangential and sagittal directions. The configuration or dimensions of the reflector frame and any mechanical limiters or connections are thus carefully selected and individually customised for each heliostat in an array to focus the reflected image on the receiver and as the angle of incidence of sunlight varies throughout the day. For simplicity it is possible to group heliostats in an array with similar passive adjustment properties, allowing the total number of unique combinations of chassis bearers 31, chassis rails 30, and mechanical limiters 120 to be minimised for the array.

For a toroidal heliostat, it is preferred that the tracking mechanism 12 operates using what can be referred to as a "spinning elevation tracking method". That is, the reflector should be rotatable about a first axis 16 aligned with the centre of the target (about which the reflector may "spin"), and a second axis 17 substantially orthogonal to and rotatable about the first axis 16 (thereby allowing adjustment of the "elevation"). Using the spinning elevation tracking method, the reflector axis (i.e. the imaginary line normal to the centre of the reflector) remains aligned within a plane formed by the angle between the sun, reflector, and receiver.

Figure 13:
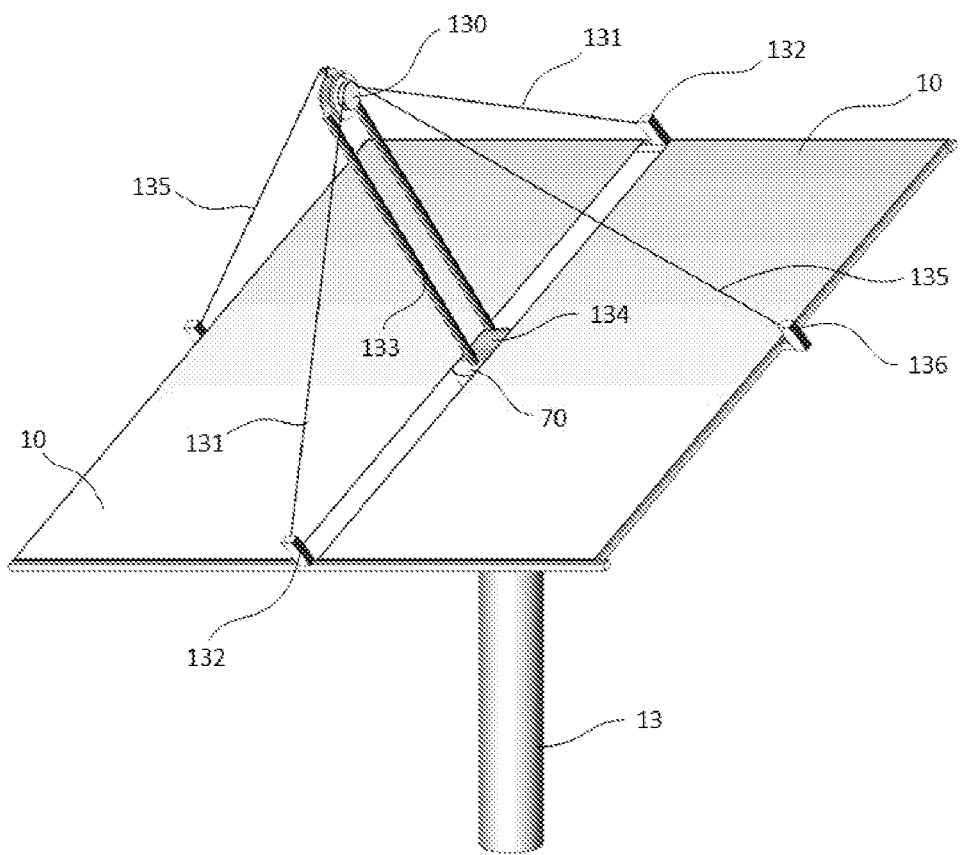
FIG. 13 is a diagram of yet a further embodiment of a heliostat according to the present invention, comprising an alternative mounting/tracking mechanism.

In another embodiment of the invention, the "spinning elevation tracking method" is employed by an alternative tracking mechanism comprising a cable-actuated elevation drive system as shown in FIG. 13. The elevation drive is a cable drive system 130 positioned on a structure 133 in front of the reflector 10, and mounted onto the front of the rotation slew drive 70. The elevation drive support structure 133 protrudes through a split between two mirror facets of the reflector 10, oriented along the tangential direction. The elevation movement is transferred to the mirror via cables 131 to connection points 132. The elevation drive transfers cable from one side to the other, causing the mirror to tilt or rotate freely about a pivot 134 located in front of the rotation drive 70. The length of cables 131 determines the static and dynamic curvature of the mirror facet in the tangential direction. Additional cables 135 connecting the top of the elevation drive support structure 133 to the mirror along the elevation pivot axis 136 determine the static and dynamic curvature of the mirror in the sagittal direction. Cables 130 and 135 may alternatively comprise chains, ropes, wires, or the like.

In this embodiment, the elevation drive support structure 133 is aligned with the rotation axis and points directly at the target according to the convention of the spinning elevation tracking mechanism. The shadow cast by the elevation drive and support structure will thus always fall substantially in the space between the two mirror facets. The result of this is that there will be very limited reduction in the efficiency of the mirror surfaces due to shading or blocking of the elevation drive unit.

Figure 14:
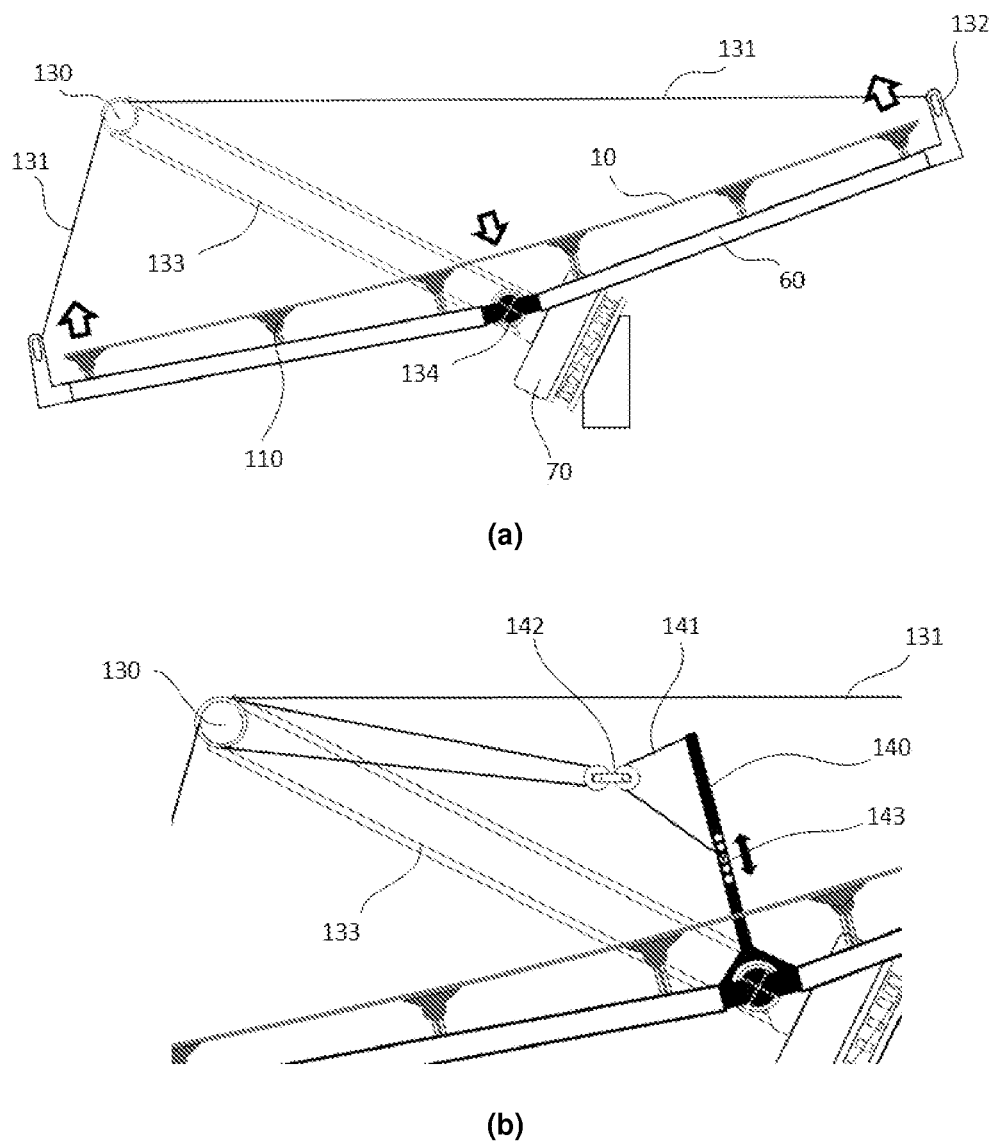
FIG. 14 shows diagrams of (a) the heliostat of FIG. 13 in an alternative alignment; and (b) a detailed view of a variation of the embodiment of FIGS. 13 and 14(a) including a simple mechanical dynamic balancer.

Referring to FIG. 14(a) the geometry of this embodiment of the elevation drive system has the property that the length of the wires 131 between the mirror connection points 132 and elevation drive 130 vary significantly with the elevation angle (the angle between the reflector 10 and the elevation drive support structure 133). It is necessary to compensate for varying length of the wire for the normal operation of the heliostat as well as for the passive adjustment of the reflector in the tangential direction.

Compensation for variation in the length of wire 131 can be achieved using a simple mechanical dynamic balancer. Referring to FIG. 14(b), the simple dynamic balancer is preferably constructed using a short perpendicular arm 140 mounted to the reflector and an additional balancer wire 141 that passes through a double pulley block 142 with the main elevation drive wire 131. The degree of passive adjustment is selected by positioning the termination of the balancer wire 141 in the appropriate hole 143 along the arm 140, or by varying the length of the balancer wire 141. As the mirror moves, the double pulley block moves along an elliptical path, such that the correction applied to the elevation actuation wire is tuneable.

Alternative dynamic balancer configurations are possible and may be used without departing from the scope of the invention. The requisite dynamic modulation of tangential and sagittal curvature of the reflector is generally a function of the angle of incidence of sunlight on the reflector. When using the spinning elevation tracking mechanism, the angle of incidence of light is substantially equivalent to the elevation angle of the reflector (the angle between the vector to the target and the imaginary vector normal to the reflector centre. Hence, the position of the elevation drive 130 with respect to the reflector may also be used to modulate the sagittal curvature. The nature of the connection 136 determines the effective length of the wire 135 as the reflector rotates in use. Alternatively, simple dynamic balancer systems such as the elliptical length correction balancer shown in FIG. 14(b) may also be applied to the rotation movement to induce passive deflections in the sagittal direction via the wire 135 shown in FIG. 13. Dynamic balancers for the sagittal direction may also make use of the relative motion between the top of the post and the output of the rotation drive (or front and back plates mounted to the rotation drive). The relative motion is used to induce a change in the length of the wire 135.

In yet another embodiment of the invention, the toroidal reflector 10 and/or reflector frame of a heliostat may be adapted to passively adjust the focal lengths of the reflector 10 dependent on temperature, rather than the orientation and weight of the reflector frame.

In general, ambient temperatures and radiant heat from the sun are at their highest towards the middle of the day when the sun is at its peak. At the beginning and/or end of the day, the ambient temperature and temperature of the heliostat will be somewhat lower. Conveniently, these extremes tend to correspond with the minimum and maximum angles of incidence upon the reflector (with respect to the normal), respectively. Alternatively, temperature variations between the seasons may be exploited to set a "baseline" focal length (i.e. compensating for the changing path of the sun throughout the year) which may be combined with the mechanical (gravitational) deflections described above to adjust the focal lengths and compensate for the movement of the sun throughout the day.

Using differential thermal expansion properties of the components of the heliostat, variation in the curvature of the reflector can be induced. This can be achieved by adhering or bonding the reflective surface to a backing that has a different coefficient of thermal expansion, or by using materials in the support structure that induce deflections in the chassis as a function of temperature.

As in the previous embodiments, deflection of the reflector 10 in both the tangential and sagittal can be controlled by carefully designing the dimensions and materials of the heliostat to vary the curvatures and optimise the reflected image. In a particular embodiment, at certain times of the day one or more heliostats in a solar array may be adapted to partially shade or block light on/from an adjacent heliostat, such that the thermal expansion occurs in a more predictable manner.

FIG. 15 illustrates the effective tangential and sagittal focal lengths of a heliostat according to the present invention (solid lines) against the corresponding focal lengths of a comparable toroidal heliostat of the prior art (dotted lines). It can be seen that the effects of astigmatism are significantly reduced in the present invention, and the focal lengths are maintained substantially constant (at approximately 34 m) throughout a substantial proportion of daylight hours. In comparison, the focal lengths of the conventional toroidal heliostat are parabolic, varying significantly with the angle of incidence as the sun moves through the sky.

Another advantage of the present invention is that it also offers an additional parameter for optimisation of image size for obscure shape receiver apertures. This is a problem for all off-centre heliostats in an array which are not directly in front of the receiver aperture. The oblique angle of incidence from the heliostat to the receiver means that the apparent aperture is an irregular shape (e.g. a trapezium or trapezoid, rather than a rectangle), posing problems for the efficient collection of reflected light. With passive focal length adjustment, these irregular apparent aperture shapes are easily accommodated by optimising the dynamically varying focal lengths to produce heliostat images of appropriate shapes to be collected by the aperture.

In any embodiment of the present invention, it is desirable to have a component and/or dimension in the reflector frame or tracking mechanism which can be easily modified to obtain the required levels of deflection in every heliostat of an array, without requiring significant changes to the basic design or physical structure of the heliostat. The examples described above with respect to FIGS. 3-6, 8 and 9 achieve this by providing a structure in which the spacing between the chassis bearers 31 and chassis cross-members 60 and the static curvature of the toroidal reflector can be varied to obtain the desired static and dynamic curvature and deflection. The examples described above with respect to FIGS. 12, 13 and 14 achieve this by providing a tether or connection that may be varied in length, rigidity or connection location to obtain the required static and/or dynamic curvature and deflection.

According to another aspect, therefore, the invention consists in a method of designing a toroidal heliostat adapted for passive adjustment as described herein. Simulation and optimisation of a heliostat image is central to the optimisation of the heliostat surface curvature. The effects of astigmatism, aberration, and solar ray angular divergence all play a part in the size and shape of the reflected image. In addition, the apparent aperture determines to some extent the optimisation criteria.

Optimisation of heliostat surface curvature preferably involves testing (through simulation) the images obtained from a large number of different surfaces, and selecting the one that performs best according to the optimisation criteria. This involves optimisation of both static and dynamic properties of the surface.

The simulation preferably involves the use of ray tracing, and/or analytical and numerical techniques to predict the shape of the image from a heliostat reflector at different times of day and year. Optimisation is achieved by testing the performance of different heliostat reflector surface configurations (i.e. different static and dynamic sagittal and tangential curvature radii), and choosing the one parameter set that best meets the optimisation criteria.

The output of the optimisation process for each heliostat in a solar array preferably comprises: 1) static focal lengths in the sagittal and tangential directions (the heliostat reflector conforms to these when in the upright/vertical orientation); and 2) dynamic deflection readings in the sagittal and tangential directions (preferably in the form of a number of millimetres of deflection of the centre of each curve when the heliostat is in the flat/horizontal orientation).

Having determined the static and dynamic parameters of the optimum reflector surface, the variable components and/or dimensions in the heliostat chassis and tracking mechanism are designed to match these specifications. The choice of configuration of the dynamic aspect of the design is based on structural deflection calculations and experimental measurements of the curvature of heliostat mirrors as a function of orientation of the frame and/or temperature. The heliostat chassis/reflector configuration is chosen to match the ideal case found by simulation and optimisation.

The heliostat is optimised according to optimisation criteria, which might include a required power delivery profile, and/or the apparent size/shape of the receiver aperture, for example. This means that the heliostat may not necessarily always be optimised for maintaining constant optical focal lengths. Combinations of such criteria may be combined in a set which defines the desired performance of the heliostat.

In the former case, for example, if the heliostat is required to generate power early in the morning in preference to other times of day, then the heliostat curvature will be optimised for the morning only. The required power profile thus does not necessarily correspond with maintaining substantially constant apparent focal lengths in either or both of the tangential and sagittal directions throughout the day. In the latter case, if the apparent aperture is an unusual shape (such as a thin rectangle) then the optimisation will be to create an image that fits the aperture. Certain times of the day will tolerate long images, while others will not.

Although the invention has been described above with reference to several example embodiments, it is to be appreciated from the foregoing that a large number of modifications or variations are possible without departing from the scope of the invention. A non-exhaustive list of further variations are described below by way of example.

In the preferred embodiments illustrated in the drawings, the toroidal reflector 10 comprises a single continuous reflective surface, curved smoothly in both the tangential and sagittal directions. However, the toroidal reflector 10 could alternatively be made up of a plurality of facets. In general, the single continuous smooth facet is most effective. However, due to material processing constraints, it may be simpler to use sets of thin, one axis facets (i.e. curved in one direction, such as the sagittal direction, and flat in the other direction) placed side by side. The flat direction of these one-axis facets may be canted to approximate the curvature in the second direction. In this embodiment, each chassis rib 30 basically defines a one-axis curvature.

In this embodiment of the invention, each reflector facet and support rib 30 could be bonded into a composite material. The reflector would thus be made up of a plurality of canted one-axis curved elements/facets placed side by side to approximate the toroidal heliostat curvature. Alterations to a facet's static curvature could be administered by varying the tension applied to the edges of a reflector facet membrane. The membrane would then conform dynamically to the passive deflections of the chassis that provides the support structure for the membrane.

In another alternative reflector embodiment, the reflector may be made up of a plurality of planar facets arranged in a grid and each angled in both the tangential and sagittal directions to approximate a toroidal shape. The precision of the approximation would thus depend on the number of planar facets in the grid, for a given area.

In variations of the embodiment of the invention illustrated in FIG. 11, the mounting members 110 not limited to being provided only at the four corners of the chassis. If more supports are included, chassis curvature will begin to influence the reflector curvature. The dynamic operation is achieved through the bending in the reflector sheet over its support points. However, the appropriate type and number of mounting means may vary depending on the strength and stiffness of the reflector sheet, and specific requirements of the connection to the sheet (e.g. glue or tape, bolting etc).

In another embodiment, the reflector may be made from a stretched membrane reflector. By way of example, an alternative embodiment of the invention is shown in FIG. 16 where the facets of the reflector are made from four triangular stretched membranes 160 spanning between the mirror corners 132 and 136, and the elevation pivot 134. Tension applied to the membrane facets 160 from the corners of the reflector chassis at points 132 and 136 is used to keep the membrane taught. Passive adjustment may be achieved in the same way as discussed above with reference to FIG. 13, The membrane facets 160 are connected continuously along the sagittal direction to the sagittal framing member 161 such that the curvature of the sagittal framing member is transferred into the membranes 160. The static and dynamic sagittal curvature may be varied by changing the tension on the wires 135 between the top of the elevation drive support structure 133 and the connection points 136. The membrane facets are predominantly tensioned from the connection points 132 and form approximately flat panels in the tangential direction. The tangential curvature may be altered passively and dynamically by changing the tension on the wires 131 joining the elevation drive and the vertically opposing corners of the mirror.

Membrane reflectors have poor accuracy when wind forces cause them to deflect or flutter like sails. To ensure the survivability and longevity of the membrane based mirror, the membrane may be rolled up around the sagittal framing member 161 when the heliostat is not in use, during high wind events or storms.

In yet other embodiments, a passively deflecting reflector of the present invention may be combined with a mounting mechanism using any tracking method beside the preferred spinning elevation method. The passive deflection concept of the present application may also be used with reflectors of other geometric configurations beside toroidal reflectors, such as spherical and/or planar heliostat reflectors.

In other potential variations of the invention, the first and second framing members need not necessarily be straight or have a C-shaped cross-section, and the slew drives are not limited to having electric motors and worm gears.

It will also be appreciated that the present invention may be provided in any of various forms. For example, the invention may be provided in a complete heliostat or kitset form including all of the required components of a heliostat, or may be supplied with various combinations of those components, in particular the toroidal reflector, tracking mechanism, and/or pier. Alternatively, the invention may be designed and/or provided in the form of a reflector frame for use with other components (such as a reflector) supplied by third parties.

The present invention may also broadly be said to consist in a method of designing a reflector frame for a heliostat, including at least the steps of simulating the heliostat and deriving dimensions of a reflector frame to obtain desired passive adjustment of tangential and sagittal focal lengths dependent upon the orientation and/or temperature of the reflector frame.

From the foregoing it will be seen that a heliostat is provided which provides advantages over the prior art in terms of maintaining substantially constant focal lengths and/or maintaining a desired image shape over the course of a day. This leads to improved efficiency, without the cost of additional components necessary to actively modify the focal lengths. The preferred embodiments of the invention provide a heliostat design which can be easily adapted for meeting a wide range of optimisation criteria, without modification of the fundamental design, leading to reduced design, manufacturing and/or installation costs.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A heliostat for reflecting incident sunlight to a receiver, comprising:
    a toroidal reflector having predetermined static curvatures in orthogonal sagittal and tangential directions and being adapted to deflect in at least one of the sagittal and tangential directions;
    a reflector frame upon which the toroidal reflector is mounted, the reflector frame inducing said deflection passively; and
    a rotatable mounting mechanism upon which the reflector frame is mounted, the mounting mechanism having a first axis of rotation configured to be aligned with the receiver, and a second axis of rotation substantially orthogonal to and rotatable about the first axis,
    wherein said passive deflection, in use, independently modifies the curvature of the reflector in at least one of the sagittal and tangential directions to optimize at least one of apparent sagittal and tangential focal lengths for variable angles of incidence of sunlight upon the reflector.

2. The heliostat of claim 1, wherein the deflection of the toroidal reflector in use is at least one of gravitationally-, thermally- or mechanically-induced, and is dependent upon at least one of alignment or temperature of at least part of the heliostat.

3. The heliostat of claim 1, wherein the passive deflection is predictable and repeatable, and
at least one of said apparent sagittal and tangential focal lengths are optimized to meet predetermined optimization criteria.

4. The heliostat of claim 3, wherein said optimization criteria comprises one or more of a required power delivery profile, and the apparent size or shape of an aperture in the receiver.

5. The heliostat of claim 1, wherein at least one of said apparent sagittal and tangential focal lengths are optimized by selection of at least one of appropriate geometry or materials of the heliostat to provide the required dynamic deflection.

6. The heliostat of claim 1, wherein the rotatable mounting mechanism comprises a rotation slew drive configured to be mounted to a fixed platform and rotate about the first axis, and an elevation slew drive mounted to the rotation slew drive and configured to receive the reflector frame and rotate about the second axis.

7. The heliostat of claim 1, wherein the rotatable mounting mechanism comprises a rotation slew drive configured to be mounted to a fixed platform and rotate about the first axis, and a cable-actuated elevation drive mounted to the rotation slew drive and configured to tilt the reflector frame about the second axis.

8. The heliostat of claim 7, wherein the elevation drive is mounted to the distal end of an elevation drive support structure projecting forward of the reflector and aligned, in use, with the receiver.

9. The heliostat of claim 7, wherein the rotatable mounting mechanism further comprises a dynamic balancer compensating for variations in the lengths of cables of the cable-actuated elevation drive as the reflector is tilted, and
wherein the dynamic balancer is adjustable such that the compensation for variation in length of cables allows for varying degrees of passive deflection to be induced in the heliostat reflector.

10. The heliostat of claim 1, wherein the rotatable mounting mechanism further comprises a manual adjustment mechanisms configured to manually adjust the first axis into a desired alignment, and
wherein the manual adjustment mechanism comprises a pair of annular wedges provided about a spigot and rotatable with respect to each other, the wedges comprising interlocking rings on respective facing surfaces thereof to prevent translational movement with respect to each other.

11. The heliostat of claim 1, further comprising a mechanical limiter to limit or dampen high amplitude deflection of the reflector or reflector frame and thereby prevent damage to the heliostat, and
wherein the mechanical limiter comprises a tether between the reflector and the mounting mechanism permitting small deflections required for passive deflection, but damping high amplitude vibrations of the reflector.

12. The heliostat of claim 11, wherein the mechanical limiter is configured to induce further deflection dependent upon the alignment of the reflector.

13. The heliostat of claim 1, wherein the toroidal reflector comprises one or a plurality of curved facets.

14. A reflector frame for supporting a concave toroidal reflector of a heliostat,
wherein the reflector frame is configured to independently induce dynamic passive deflection of the toroidal reflector in at least one of tangential and sagittal directions thereof to passively optimize an apparent focal length of the reflector in at least one of said directions, in use.

15. The reflector frame of claim 14, further comprising:
at least one first framing member aligned in a first direction; and
at least one second framing member aligned in a second direction substantially orthogonal to the first direction, the second framing member being attached to the first framing member and adapted for attachment to the toroidal reflector,
wherein at least one of the first and second framing members independently induces limited dynamic passive deflection in the toroidal reflector in the respective first or second direction, in use.

16. The reflector frame of claim 15, wherein a direction and magnitude of said deflection in use is determined substantially by attachment positions between the first and second framing members, and said attachment positions are predetermined to optimize an image reflected by the heliostat based upon a known position of the heliostat in a solar field, with respect to a target.

17. The reflector frame of claim 15, wherein at least one of said first and second framing members are semi-rigid and configured to deflect and induce a corresponding deflection in the toroidal reflector.

18. The reflector frame of claim 14, further comprising mounting members configured to support the toroidal reflector whilst permitting deflection thereof.

19. The reflector frame of claim 14, wherein said deflection is caused at least in part by a weight of the reflector frame or toroidal reflector due to gravity, whereby said dynamic deflection is dependent upon alignment of the reflector frame as the reflector frame is rotated in use.

20. The reflector frame of claim 14, wherein said deflection is caused at least in part by differential thermal expansion between materials of the heliostat, whereby said dynamic deflection is dependent upon a temperature of at least a part of the heliostat.

21. The reflector frame of claim 14, wherein said deflection is caused at least in part by relative movement between the reflector frame and the heliostat, in use.

22. The reflector frame of claim 14, further comprising a mechanical limiter to limit or dampen high amplitude deflection of the reflector or reflector frame and thereby prevent damage to the heliostat.

23. The reflector frame of claim 14, wherein the reflector frame is configured to obtain one of:
substantially constant apparent focal lengths in at least one of sagittal and tangential directions of the toroidal reflector,
a desired power delivery profile, and
an image reflected by the heliostat which substantially matches a shape of an aperture of a target.

24. A heliostat comprising:
the reflector frame according to claim 14; and
a reflector supported by the reflector frame,
wherein passive deflection of the reflector is induced by one or more of:
gravitationally-induced deflection of one or more components of the heliostat,
differential thermal expansion of materials of the heliostat, and relative movement between two or more components of the heliostat.

* * * * *